US012710896B2

(12) United States Patent
Minz et al.

(10) Patent No.: US 12,710,896 B2
(45) Date of Patent: Aug. 18, 2026

(54) SEPARATE COMMAND ADDRESS (SCA) BASED MEMORY CONTROLLER

(71) Applicant: Micron Technology, Inc., Boise, ID (US)

(72) Inventors: Leonid Minz, Beer Sheva (IL); Ali Feiz Zarrin Ghalam, Sunnyvale, CA (US); Yoav Weinberg, Thornhill (CA)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/034,138

(22) Filed: Jan. 22, 2025

(65) Prior Publication Data

US 2025/0251877 A1 Aug. 7, 2025

Related U.S. Application Data

(60) Provisional application No. 63/549,944, filed on Feb. 5, 2024.

(51) Int. Cl.
*G06F 3/06* (2006.01)

(52) U.S. Cl.
CPC .......... *G06F 3/0659* (2013.01); *G06F 3/0613* (2013.01); *G06F 3/0679* (2013.01)

(58) Field of Classification Search
CPC ..... G06F 3/0613; G06F 3/0659; G06F 3/0679
See application file for complete search history.

(56) References Cited

U.S. PATENT DOCUMENTS

| | | | | |
|---|---|---|---|---|
| 11,199,996 | B2 | 12/2021 | Seo | |
| 11,321,022 | B2 | 5/2022 | Buxton | |
| 2006/0129764 | A1* | 6/2006 | Bellows | G06F 13/1631 711/125 |
| 2016/0306553 | A1* | 10/2016 | Ellis | G06F 12/02 |
| 2017/0180477 | A1* | 6/2017 | Hashimoto | G06F 12/0246 |
| 2017/0293499 | A1 | 10/2017 | Che et al. | |
| 2018/0321864 | A1* | 11/2018 | Benisty | G06F 3/0634 |
| 2024/0295989 | A1* | 9/2024 | Kavala | G06F 3/0658 |
| 2024/0402927 | A1* | 12/2024 | Richter | G06F 3/061 |

* cited by examiner

*Primary Examiner* — Larry T Mackall
(74) *Attorney, Agent, or Firm* — Brooks, Cameron & Huebsch, PLLC

(57) ABSTRACT

The subject application relates to separate command address (SCA) protocol-based memory controllers. For instance, a method may include receiving, by a separate command address (SCA)-based memory controller, a plurality of commands, scheduling, by the SCA-based memory controller, the plurality of commands using two or more data path scheduler (DPS) request queues, converting the scheduled plurality of commands into SCA-based commands, selecting, from the scheduled SCA-based commands, one or more scheduled SCA-based commands for a sequence execution, and executing in sequence the selected one or more SCA-based commands using one or more logical units (LUNs) of a channel in a memory component.

18 Claims, 5 Drawing Sheets

SEPARATE COMMAND ADDRESS (SCA) BASED MEMORY CONTROLLER

PRIORITY INFORMATION

This application claims the benefit of U.S. Provisional Application No. 63/549,944, filed on Feb. 5, 2024, the contents of which are incorporated herein by reference.

TECHNICAL FIELD

The present disclosure relates generally to electronic systems and, more specifically, to scheduling an execution pipeline via an SCA-based memory controller.

BACKGROUND

A memory sub-system can include one or more memory components that store data. The memory components can be, for example, non-volatile memory components and volatile memory components. In general, a host system can utilize a memory sub-system to store data at the memory devices and to retrieve data from the memory devices. A memory sub-system can be a storage system, storage device, a memory module, or a combination of such. An example of a memory sub-system is a storage system such as a solid-state drive (SSD).

DETAILED DESCRIPTION

Figure 1:
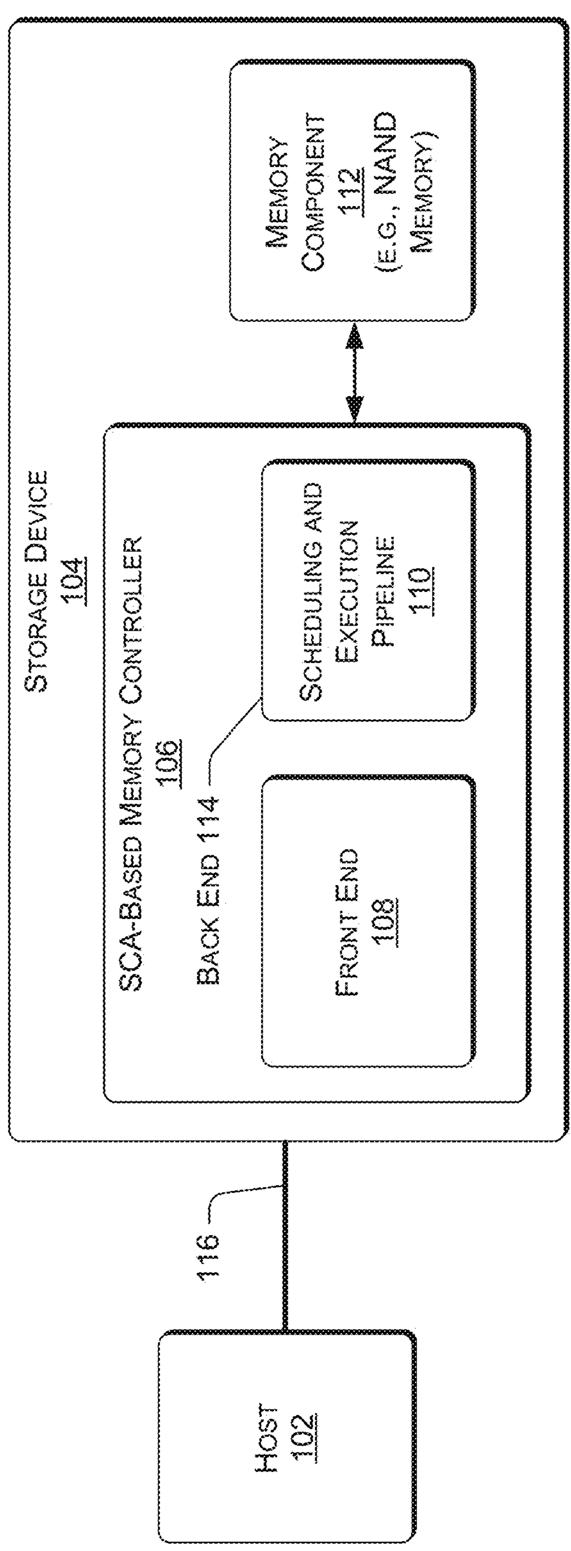
FIG. 1 is a block diagram of an example memory system in accordance with a number of embodiments of the present disclosure.

The present disclosure includes apparatuses and methods related to improving sequence execution of commands at a back end of a storage device (or storage apparatus) to ensure efficient data transfer, storage, and retrieval in the storage device. Particularly, the back end of the storage device may include a communication between a separate command address (SCA)-based memory controller and a memory component (e.g., one or more memory devices or dice). The SCA-based memory controller may manage, among other things, a scheduling and execution pipeline for a plurality of commands. The SCA-based memory controller may also manage data transfers in parallel with the sequence execution of the plurality of commands. The SCA-based memory controller may observe an SCA protocol that can define, without limitation, specific command usage/functionalities, timing parameters, and pin layouts of the memory component. The memory component, for example, can be a NAND flash memory device.

The SCA protocol is a part of an Open NAND Flash Interface (ONFI) standard and can be implemented particularly at the memory controller to improve the sequence execution of commands. For example, the SCA protocol may be implemented to perform parallel scheduling of commands via use of two or more request queues to improve the amount and time of data processing. In this example, the memory controller may receive high-level commands, and transform the high-level commands into low-level SCA-based commands to comply with the SCA protocol. As opposed to other standards such as Legacy ONFI standard, more than one request queue may be used by the SCA protocol to schedule high-level commands. Further, the memory controller in the SCA protocol is agnostic to the type of high-level commands that are further converted into low-level SCA commands.

In some embodiments, the storage device may include a front end that can be used for initial data processing of the high-level commands. For example, the initial data processing may include translating a plurality of high-level commands such as PCIe or UFS commands into specific actions or device functions and then storing the device functions in a memory. The stored device functions may include read, write, and management commands. The back end may then pick up the stored device functions and further convert the device functions into low-level SCA-based commands, which are treated herein as the commands that comply with the SCA protocol.

In some embodiments, the storage device's back end may schedule requests for the picked-up commands via different parallel request queues; convert the PCIe, UFS, or similar non-ONFI commands into SCA-based commands; and arbitrate sequence executions of the scheduled SCA-based commands. The back end may further track execution of outstanding workloads at the memory component, and/or perform update status of the tracked workloads that are associated with the scheduled SCA-based commands. The status may be used for scheduling of subsequent SCA-based commands.

For example, a scheduling and execution pipeline at the storage device's back end may include a data path scheduler (DPS) component and a NAND flash controller (NFC) sequencer component. In this example, the DPS is a hardware and/or software component that can schedule for execution of the multiple high-level commands via use of two or more DPS request queues. The DPS may use two or more different DPS request queues to transmit the scheduled high-level commands to the NFC sequencer. The NFC sequencer may then use multiple thread engines to further convert the high-level commands (or device functions) into low-level SCA-based commands, process the SCA-based commands, and arbitrate the one or more scheduled SCA-based commands for sequence execution in the memory component. The processing, for example, may include ensuring the scheduled SCA-based commands to comply with the SCA protocol. The NFC sequencer may then arbitrate on the scheduled SCA-based commands to create an NFC sequencer queue. The arbitrations may be based on priority associated with the scheduled SCA-based commands, type of operations associated with SCA-based commands such as a dependent or independent operations, whether the SCA-based command is a low-level command, and further based on other parameters that may be defined by the SCA protocol.

The memory component may include, for example, NAND flash memory devices that adhere to the ONFI standard. ONFI is an industry-standard interface specification for NAND flash memory devices to ensure compatibility and interoperability across different manufacturers of NAND flash memory products. The SCA protocol as described herein is a part of the ONFI standard. In some embodiments, the memory component may include a plurality of channels where each channel can be associated with a corresponding pair of DPS and NFC sequencer components. In the example above, a DPS-NFC sequencer pair may use a command/address (CA) bus to send the selected one or more SCA-based commands to a corresponding channel, which may include one or more logical units (LUNs) to process the SCA-based commands. A LUN may include a minimum unit in the channel that can independently execute the SCA-based command and report status of the execution of the SCA-based command. The CA bus for each channel may be paired with a corresponding data (DQ) bus.

In some embodiments, the NFC sequencer may tract the sequence execution of the SCA-based commands in the channel and the NFC sequencer can transmit LUN updates to the DPS. The DPS, for example, may use the LUN updates to schedule a next set of high-level commands via the plurality of DPS request queues. By leveraging the scheduling of high-level commands via the use of different DPS request queues and arbitrating the one or more SCA-based commands for sequence execution, the SCA-based memory controller may improve the sequence execution of the SCA-based commands at the back end of the storage device.

As used herein, the singular forms "a," "an," and "the" include singular and plural reference unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2. Further, analogous elements within a Figure may be referenced with a hyphen and extra numeral or letter. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of an example apparatus 100 in accordance with an embodiment of the present disclosure. Apparatus 100 can be a computer, server, or any similar device that includes a host 102, which is coupled to a storage device 104. Without limitation, the storage device 104 may further include an SCA-based memory controller 106 with a front end 108 and a scheduling and execution pipeline 110, and a memory component 112. The scheduling and execution pipeline 110 is also referred to as a back end 114 of the SCA-based memory controller 106. The host 102, storage device 104, front end 108, back end 114, memory component 112, or a combination thereof, can be referred to as the "apparatus" herein.

The host 102 can be another computing device such as desktop computer, laptop computer, network server, mobile device, or such computing device that may include a memory and a processing device. The host 102 may communicate with the storage device 104 via an interface 116, which can be a PCI Express (PCIe), Serial Attached SCSI (SAS), SCI, Fibre channel and NVM Express (NVMe), or a similar interface such as a Universal Flash Storage (UFS) interface. The host 102 may use the storage device 104, for example, to write data to the storage device 104 or read data from the storage device 104.

The front end 108 may receive high-level commands (e.g., write commands, read commands, etc.) from the host 102, and translate the high-level commands into specific actions and operations (i.e., device functions) that the storage device 104 can implement to fulfill the received high-level commands. As described herein, the device functions are also referred to as high-level commands, which are then converted into low-level SCA-based commands at the scheduling and execution pipeline 110. Although not shown, the front end 108 may include a processor, and a memory that stores the device functions, which are subsequently forwarded or picked up by the back end 114. In some embodiments, the back end 110 may include DPS/NFC blocks (not shown) in the scheduling and execution pipeline 110 that can be used for further processing of the picked up stored device functions. For example, the DPS/NFC block may convert the picked-up device functions into SCA-based commands to comply with the SCA protocol and further organize the sequence execution of the SCA-based commands.

SCA-based memory controller 106 may use the front end 106 to receive and translate the high-level commands into storage device functions, which are then stored (e.g., queued) in the front end 106. The SCA-based memory controller 106 may use the back end 114 to manage the scheduling of the commands, convert the commands into SCA-based commands, and manage the sequence execution of the selected SCA-based commands. The SCA-based memory controller 106 can be a microcontroller, special purpose logic circuitry such as a field programmable gate array (FPGA), an application specific integrated circuit (ASIC), or another suitable processor. The SCA-based memory controller 106 can include a processor (not shown) configured to execute instructions stored in a local memory (not shown). The local memory, for example, may be configured to store instructions for performing various processes, operations, logic flows, and routines that control operation of the SCA-based memory controller 106.

In some embodiments, the SCA-based memory controller 106 may use the scheduling and execution pipeline 110 to manage the multiple scheduling of the device functions or high-level commands, convert the scheduled high-level commands into SCA-based commands, and implement the sequence execution of the SCA-based commands. For example, the scheduling and execution pipeline 110 may utilize a pair of DPS and an NFC sequencer (not shown) for each channel in the memory component 112 to process the scheduling and the sequence execution of the scheduled SCA-based commands. In this example, the DPS may facilitate the scheduling of multiple commands using two or more DPS request queues while the NFC sequencer may arbitrate the scheduled multiple commands for sequence or parallel executions.

The memory component 112 may include NAND flash memory chips with each NAND flash memory chip supporting multiple channels. In some embodiments, each of the multiple channels may support multiple LUNs. The memory component 112 may support parallel processing of commands and address in the CA bus and the data transfer in the DQ bus. In other embodiments, the memory component 112 may include other memory types which are architecturally enabled or configured to perform parallel operations.

In an example operation, the host 102 may send high-level command packets to the storage device 104 via the interface 116. The high-level command packets, for example, may include the request for host-write and/or host-read operations. The storage device 104 may then receive the high-level command packets via the front end 108 and translate the high-level command packets into device functions, which can still be treated as high-level commands. The back end 114 may then implement the specific actions and operations to comply with the SCA protocol and to fulfill the high-level command packets. For example, the back end 114 may perform the scheduling of the multiple commands via the use of two or more scheduling queues (not shown), converting of the scheduled commands into SCA-based commands, processing of the scheduled queues, arbitrating the one or more SCA-based commands for sequence execution, and executing in sequence via the use of the same or different channel LUNs (not shown) in the memory component 112. In some embodiments, the SCA protocol may reconfigure command/address (CA) pins in the memory component 112 to control the data bursts in the memory component 112. In this example, input commands to the CA pins are processed via a dedicated CA bus (not shown) while data bursts that are associated with the commands are processed via a separate data (DQ) bus (not shown).

Figure 2:
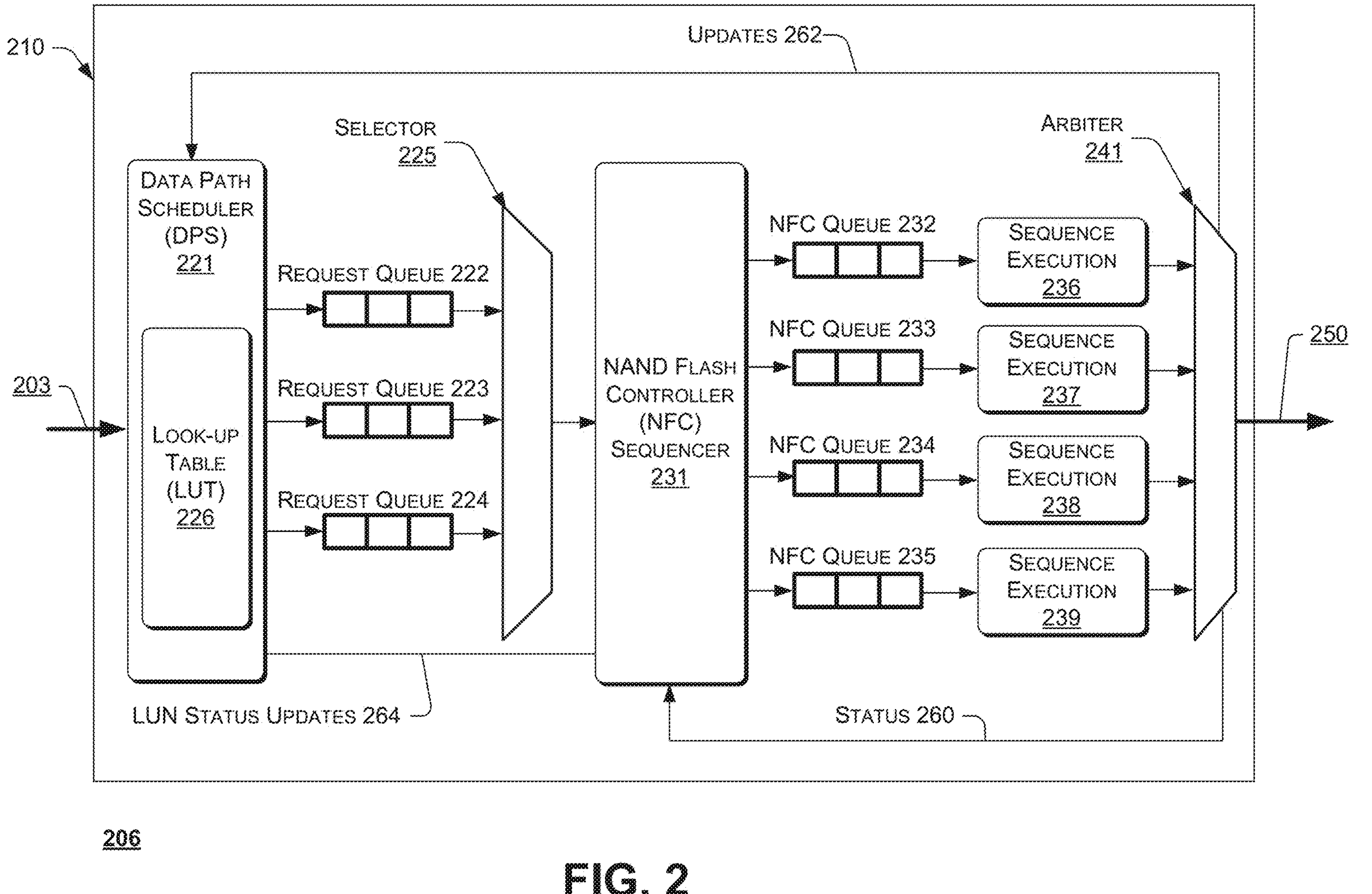
FIG. 2 is a block diagram of an example architecture of a separate command address (SCA)-based memory controller in accordance with a number of embodiments of the present disclosure.

FIG. 2 is a block diagram of an example SCA-based memory controller 206 including a scheduling and execution pipeline 210 that may be configured to schedule multiple commands 203, transform the scheduled commands 203 into low-level SCA-based commands, and organize the sequence execution of the low-level SCA-based commands in accordance with embodiments herein. The commands 203, for example, may include the device functions, which can include high-level commands that may be transformed into low-level SCA-based commands. In this example, the low-level SCA-based commands may be implemented at the back end to comply with the SCA protocol and fulfill the high-level commands from the host. As shown, an example architecture of the scheduling and execution pipeline 210 may include a data path scheduler (DPS) 221, an NFC sequencer 231, and an arbiter 241, which can generate a sequence of command executions 250 for an ONFI-NAND memory component (not shown).

The DPS 221 may utilize two or more request queues such as request queues 222, 223, 224 to schedule, in parallel, two or more commands 203 in different DPS request queues, or schedule, sequentially, two or more commands 203 over the same DPS request queue depending upon the type of operations associated with the commands 203. The NFC sequencer 231 may include a selector 225 that is coupled to the DPS 221 request queues; a plurality of NFC queues such as NFC queues 232, 233, 234, 235; and corresponding sequence executions 236, 237, 238, 239 that can be used to process or at least buffer the selected SCA-based commands in the respective NFC queues 232, 233, 234, 235. The arbiter 241 may include a multiplexer, for example, that receives the low-level SCA-based commands from the sequence executions 236, 237, 238, 239 as input and arbitrates or generates the sequence of command executions 250 for further processing by one or more LUNs (not shown) of the particular channel that is supported by the pair of DPS 221 and NFC sequencer 231. Different DPS-NFC sequencer pairs may support different channels in the ONFI-NAND memory component.

DPS 221 may include hardware, software, or a combination thereof, that may receive and schedule the commands 203 for submission to the NFC sequencer 231. The commands 203 may be representative of the picked-up stored device functions, which are treated herein as high-level commands that will be further converted into low-level commands. The DPS 221 may be paired with the NFC 231 when implementing the device functions to comply with the SCA protocol and fulfill the high-level commands from the host. In some embodiments, the DPS 221 may schedule the commands 203 based upon the type of operation that is associated with each command such as whether the command is associated with a dependent or independent operation; based upon the nature of the command whether it is a write operation, read operation, status read operation; and/or further based upon other parameters that may be defined by SCA protocol. For example, the status reads, senses, and write commands can be scheduled and transmitted at any time to the one or more LUNs (not shown) in the memory component if the one or more LUNs are not busy or otherwise are in a state that is not dependent of such commands. If the one or more LUNs are dependent of such commands, then the DPS 221 may treat the dependency as a condition for the scheduling of the commands and cannot directly transmit the commands at any time to the one or more LUNs.

In some embodiments, the DPS 221 may utilize two or more request queues to accommodate parallel scheduling of the commands 203. For example, a first command (read data from a first LUN) and a second command (read sense from a second or another LUN) include independent operations and as such, can be scheduled using the DPS request queues 222 and 223, respectively. In this example, the DPS 221 may leverage the number of DPS request queues to facilitate parallel scheduling to improve data processing and management.

In some embodiments, the DPS 221 may use a single DPS request queue when the second command includes an operation that is dependent upon the operation associated with the first command. For example, a data transfer from a LUN (first command) and a read sense (second command) to the same LUN can be scheduled in the same queue because these two commands are dependent with each other. In this example, the DPS 221 may schedule and communicate the first and second commands to the NFC sequencer 231 via the same DPS request queue. Here, the NFC sequencer 231 may observe the sequence of these dependent operations and send updates to the DPS 221. DPS 221 in turn may use a look-up table (LUT) 226 or similar structure to track operations within the DPS queues that include the data transfers.

In some embodiments, the LUT 226 may be used to store execution status of the SCA-based commands for purposes of tracking operations inside the DPS queues to schedule another operation in the same or different request queues. For example, the DPS 221 may use the LUT 226 to store updates of the scheduled SCA-based commands and use the stored updates when issuing or scheduling the next commands via the one or more DPS request queues. In this example, the LUT 226 may be used as a reference for deciding which request queue 222, 223, and/or 224 can be used to send the subsequent commands to the NFC sequencer 231.

In some cases, the scheduling of commands 203 that are associated with independent operations may be communicated to the NFC sequencer 231 via any of the request queue 222, 223, 224 that is substantially free. For example, a low-level SCA-based command for reading a device ID can be implemented independently from other operations in the DPS 221 request queues. In this example, the scheduling of the low-level SCA-based command may use the request queue 222, 223, or 224 that is substantially free.

NFC sequencer 231 may include hardware (e.g., multiple thread engine), software, or a combination thereof, that can convert the high-level commands from the DPS 221 into low-level SCA-based commands and place the low-level SCA-based commands into the corresponding NFC queues. The NFC sequencer 231 may be paired with the DPS 221 to process and manage the order of execution of the commands 203 based upon their priority, type, updates from the LUNs that are processing the current workload, and the like. The selector 225 of the NFC sequencer 231 may initially filter the scheduled commands that may be received from the multiple DPS 221 request queues. For example, for commands 203 that are associated with independent operations, selector 225 may implement first-in-first-out (FIFO) filtering. In another example, selector 225 may prioritize commands 203 that are associated with operations that are dependent from outstanding workloads in the memory device, and so on. In these examples, selector 225 may organize the communication of commands 203 to the memory component.

The NFC sequencer 231 may use multiple separate NFC queues 232, 233, 234, and 235 to allow sequential or parallel execution of the selected one or more SCA-based commands 203, and further provides a dedicated NFC queue for status reads, multiple low-level SCA-based commands, and the like. For example, the NFC queue 232 may be used for a scheduled low-level SCA-based command; NFC 233 may be utilized for an SCA-based command that is associated with an independent operation (pARC reads); and the NFC queue 234 may be left free for status reads. In this example, the NFC sequencer 231 may utilize multiple NFC queues to support the multiple scheduling of high-level commands in the DPS 221.

The NFC sequencer 231 may use the sequence executions 236, 237, 238, 239 to buffer and/or process the selected SCA-based commands or operations in the respective NFC queues 232, 233, 234, 235. Each of the sequence executions 236, 237, 238, 239 may include registers to temporarily hold or store the SCA-based commands or operations from the corresponding NFC queues. Each of the sequence executions 236, 237, 238, 239 may further prepare the selected commands 203 for arbitration by the arbiter 241.

In some embodiments, the arbiter 241 may include hardware, software, or a combination thereof, that selects and organizes the sequence of execution of the selected SCA-based commands from the two or more NFC queues. Arbiter 241 may be configured to create its own queue for the sending of the selected SCA-based commands in the CA or DQ bus. In some embodiments, arbiter 241 may select the sequence of execution based upon the type of operations that are associated with the SCA-based commands in the NFC queues 232, 233, 234, 235.

For example, the processed and buffered SCA-based command in the sequence execution 236 is associated with an operation that depends upon another operation that is currently being processed in one of the LUNs. In this example, the arbiter 241 may order the execution of the buffered SCA-based command based upon a status of the outstanding SCA-based command in one of the LUNs. In this example still, the status of the outstanding SCA-based command may be transmitted back to DPS 221 as updates 262. The DPS 221 may also receive LUN status updates 262 from the NFC sequencer 231. DPS 221 may utilize the updates 224 and/or LUN status updates 264 for scheduling of another one or more high-level commands that can be related to the outstanding SCA-based command.

In some embodiments, the arbiter 241 may be configured to manage the order of executions based on a request priority from the DPS 221 and/or workload that has already been issued via the sequence of command executions 250. For example, the SCA-based commands buffered in the sequence executions 236, 237, 238, 239 include different order of priorities as may configured by the DPS 221. In this example, the arbiter 241 may follow the order of priorities when selecting one or more SCA-based commands for sequence execution. In some cases, and for non-data transfer related commands, the arbiter 241 may bypass the order of priority and selects the non-data transfer related commands for execution in the memory device.

In some embodiments, the arbiter 241 may further implement partial overlapping of data bursts in the different LUNs. For example, arbiter 241 may identify different data fields such as a select chip enable (SCE) field, select chip pause (SCP) field, and/or a select chip terminate (SCT) field in a particular SCA-based command. In this example, the arbiter 241 may allow status read to overlap with SCA-based command based upon the identified SCE field. In another example, the overlapping of data burst may occur before one of the data bursts is terminated by the SCT field. In these examples, the arbiter 241 may use the identified data fields as timing parameters or references for the selection of the one or more SCA-based commands for sequence execution.

In some embodiments, the arbiter 241 may generate the sequence of command executions 250 that includes the order of sequence of execution of the SCA-based commands, which are to be communicated to the memory component (not shown). Arbiter 241 may also send a status 260 to the NFC sequencer 231 to indicate LUN status, plane status, and the like. The NFC sequencer 231 may also send the LUN status updates 264 to the DPS 321 to indicate the status of the outstanding commands that are being processed in the LUNs.

In some embodiments, the pair of DPS 221 and NFC sequencer 231 may support a particular channel (not shown) in the ONFI-NAND memory component (not shown). Accordingly, multiple pairs of DPS 221 and NFC sequencer 231 may support different corresponding channels. Each channel may include one or more LUNs that can be targeted by the arbiter 241 to process the selected SCA-based commands. The LUN may include a minimum unit that can independently execute SCA-based command and report status of the execution of the SCA-based command(s).

In some embodiments, the arbiter 241 may be configured to arbitrate between short atomic bursts of SCA-based commands. Here, the data bursts may be executed in the order given by the arbiter 241. For low-level SCA-based commands, the arbiter 241 may utilize multiple execution engines to process these low-level SCA-based commands.

Figure 3:
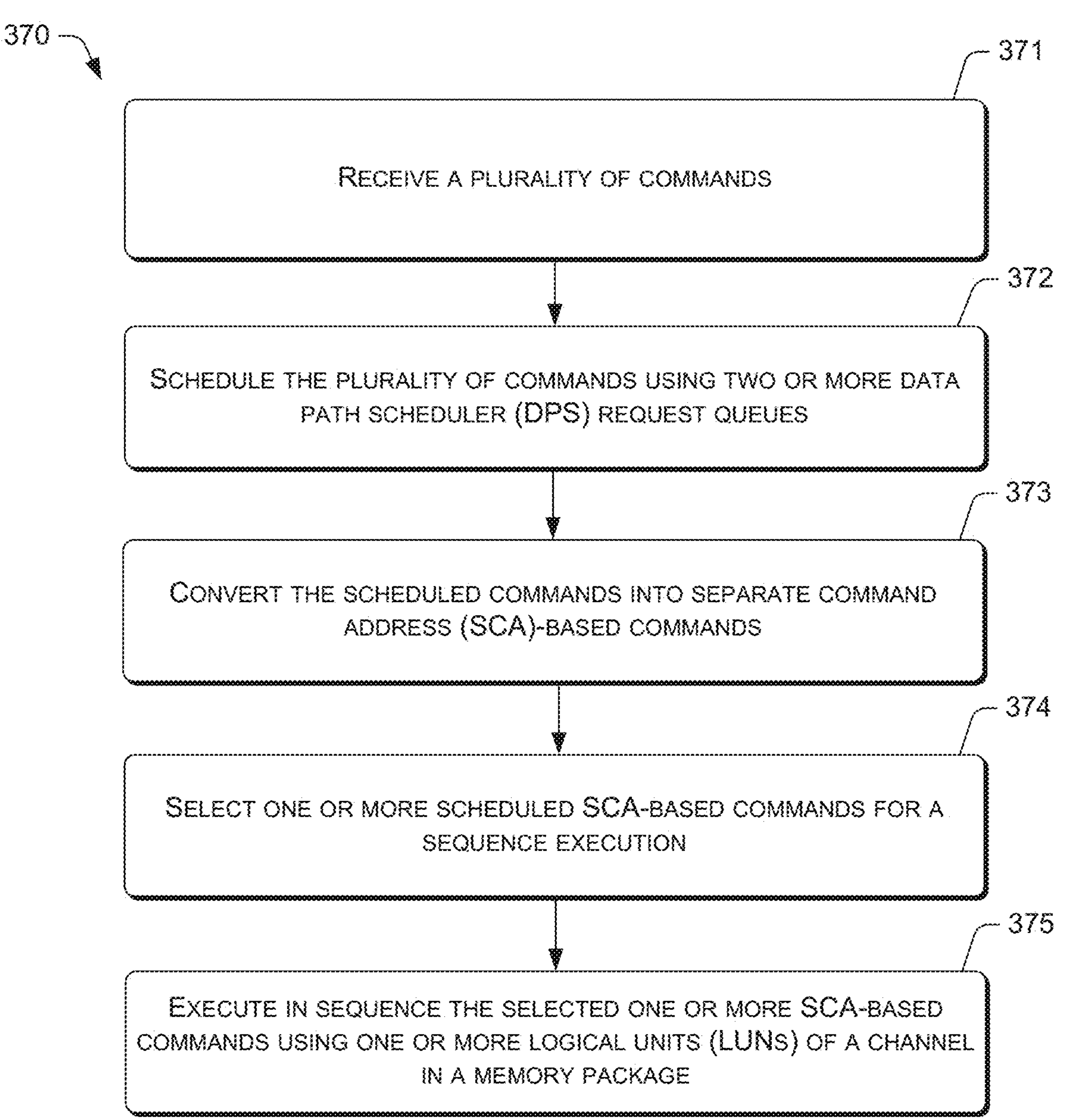
FIG. 3 is a flow diagram of a method for implementing sequence execution of the SCA-based commands in accordance with a number of embodiments of the present disclosure.

FIG. 3 is a flow diagram of method 370 for improving sequence execution of SCA-based commands at the back end of the storage device in accordance with a number of embodiments of the present disclosure. The methods described herein can be performed by hardware (e.g., a processing device, circuitry, dedicated logic, programmable logic, microcode, hardware of a device, integrated circuit, etc.). With respect to FIG. 1, for example, the method can be performed by circuitry associated with an SCA-based memory controller, such as the SCA-based memory controller 106 illustrated in FIG. 1. Although shown in a particular sequence or order, unless otherwise specified, the order of the processes with respect to any of the method flow diagrams described herein can be modified. Thus, the illustrated embodiments should be understood only as examples, and the illustrated processes can be performed in a different order, and some processes can be performed in parallel.

At 371, the method can include receiving, by an SCA-based memory controller, a plurality of commands. The received plurality of commands may include the high-level commands such as device functions. These device functions may be subsequently converted into SCA-based commands at the back end of the SCA-based memory controller.

At 372, the method can include scheduling, by the SCA-based memory controller, the plurality of commands using two or more DPS request queues. In some embodiments, the plurality of commands may be simultaneously scheduled using two or more DPS request queues. Here the commands that can be scheduled using different DPS request queues may include the commands that are associated with operations that are not dependent upon one another.

At 373, the method can include converting, by the SCA-based memory controller, the scheduled commands into scheduled SCA-based commands.

At 374, the method can include selecting, by the SCA-based memory controller, from the plurality of scheduled SCA-based commands one or more scheduled SCA-based commands for a sequence execution. Without limitation, the selection for sequence execution may be based upon dependency of operations between two or more SCA-based commands, current workload in the memory component, priority of the scheduled SCA-based commands, and the like. In some embodiments, the NFC sequence arbiter may create the NFC sequence queue for sequence execution of the plurality of scheduled SCA-based commands.

At 375, the method can include executing in sequence, by the SCA-based memory controller, the selected one or more SCA-based commands using one or more LUNs in the memory component. In some embodiments, each DPS-NFC sequencer pair may support a particular channel in the memory component. During the sequence execution of the SCA-based commands, the NFC sequencer may send LUN updates the DPS where the LUN updates are further used as references by the DPS.

Figure 4:
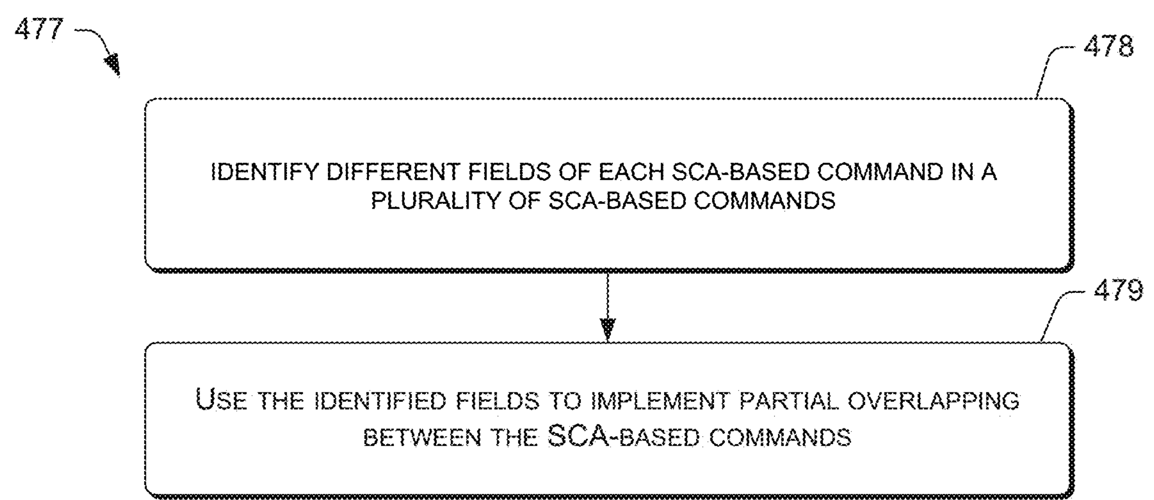
FIG. 4 is a flow diagram of a method for implementing overlapping of operations in different logical units (LUNs) in accordance with a number of embodiments of the present disclosure.

FIG. 4 is a flow diagram of method 477 for implementing overlapping of operations in the LUNs or the same LUN in accordance with a number of embodiments of the present disclosure. The methods described herein can be performed by hardware (e.g., a processing device, circuitry, dedicated logic, programmable logic, microcode, hardware of a device, integrated circuit, etc.). With respect to FIG. 1, for example, the method can be performed by circuitry associated with an SCA-based memory controller, such as the SCA-based memory controller 106 illustrated in FIG. 1. Although shown in a particular sequence or order, unless otherwise specified, the order of the processes with respect to any of the method flow diagrams described herein can be modified. Thus, the illustrated embodiments should be understood only as examples, and the illustrated processes can be performed in a different order, and some processes can be performed in parallel.

At 478, the method can include identifying, by an SCA-based memory controller, different fields of each SCA-based command in a plurality of SCA-based commands. The SCA-based memory controller may identify SCE, SCP, and/or SCT fields that can include the different timing parameters or references for data transfers in a dedicated DQ bus.

At 479, the method can include using, by the SCA-based memory controller, the identified different fields to implement partial overlapping between the plurality of SCA-based commands. For example, the SCE may be used as a reference for implementing a parallel execution between a status read and a read command. In this example, status read may partially overlap with the read command.

Figure 5:
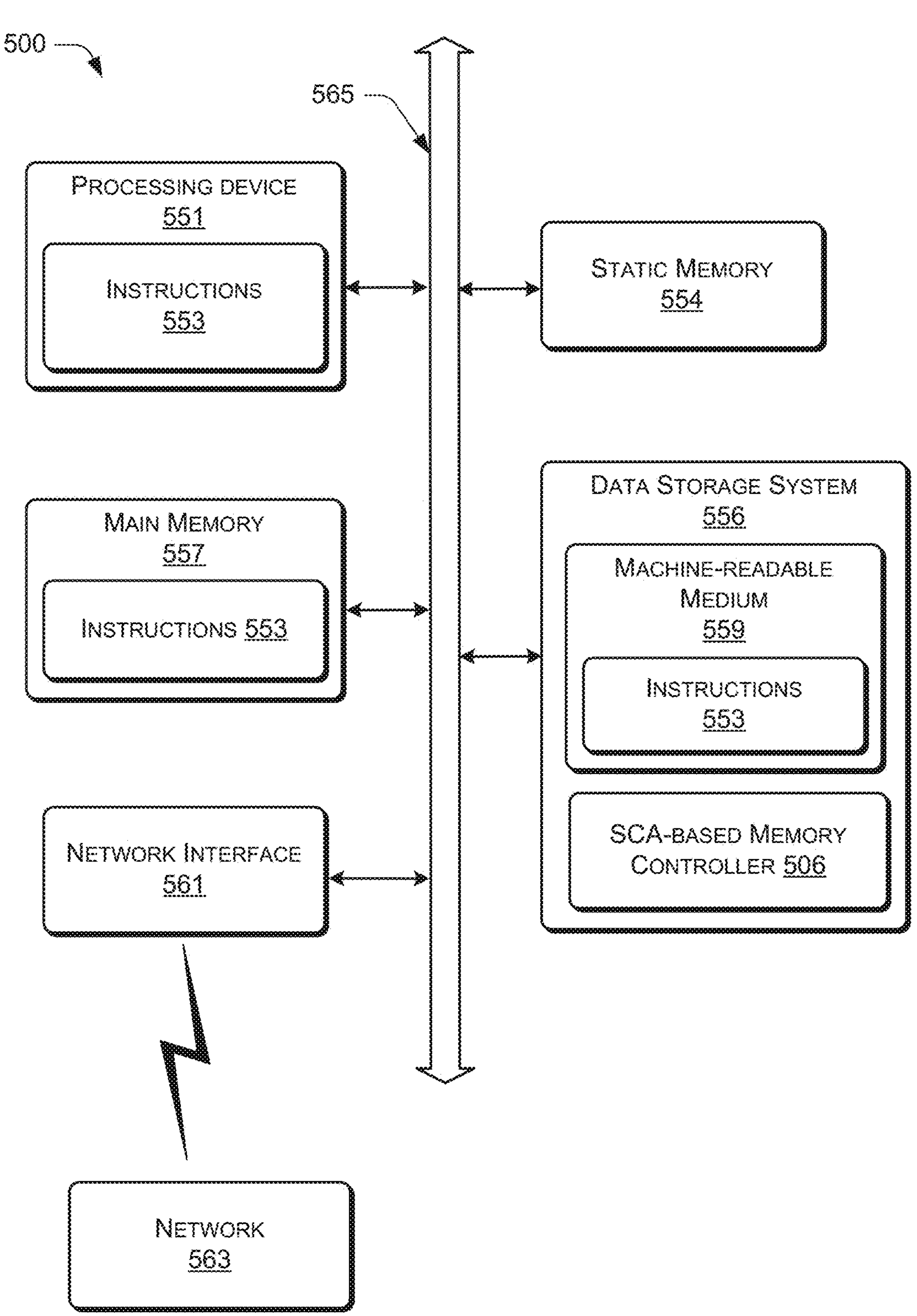
FIG. 5 illustrates an example computer system within which a set of instructions, for causing the machine to perform various methodologies discussed herein, can be executed.

FIG. 5 illustrates an example computer system 500 within which a set of instructions 553, for causing the machine to perform various methodologies discussed herein, can be executed. In various embodiments, the computer system 500 can correspond to a non-volatile memory system (e.g., the apparatus 100 as described with respect to FIG. 5). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 551, a static memory 554 (e.g., flash memory, a main memory 557, static random access memory (SRAM), etc.), and a data storage system 556, which communicate with each other via a bus 565.

The processing device 551 represents one or more general-purpose processing devices such as a microprocessor, a CPU, a GPU, or the like. More particularly, the processing device can be a CISC microprocessor, RISC microprocessor, VLIW microprocessor, or a processor implementing other instruction sets, or processors implementing a combination of instruction sets. The processing device 551 can also be one or more special-purpose processing devices such as an ASIC, an FPGA, a DSP, network processor, or the like. The processing device 551 is configured to execute instructions 553 for performing the operations and steps discussed herein. The computer system 500 can further include a network interface device 561 to communicate over the network 563.

The data storage system 556 can include a machine-readable storage medium 559 (also known as a computer-readable medium) on which is stored one or more sets of instructions 553 or software embodying any one or more of the methodologies or functions described herein. The instructions 553 can also reside, completely or at least partially, within the main memory 557 and/or within the processing device 551 during execution thereof by the computer system 500, the main memory 557 and the processing device 551 also constituting machine-readable storage media.

The instructions 553 can be executed to carry out any of the embodiments described herein. For example, the instructions 553 can be executed to implement functionality of a SCA-based memory controller 506 in the data storage system 556. The SCA-based memory controller 506 is analogous to the SCA-based memory controller 106 of FIG. 1.

While the machine-readable storage medium 559 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:

receiving, by a separate command address (SCA)-based memory controller, a plurality of commands,
- wherein the received plurality of commands includes high-level commands that are translated to observe an SCA protocol; and
- wherein a particular SCA-based command under the SCA protocol includes a select chip enable (SCE) field and a select chip terminate (SCT) field;

scheduling, by the SCA-based memory controller, the plurality of commands using two or more data path scheduler (DPS) request queues;

converting the scheduled commands into SCA-based commands;

selecting, from the scheduled SCA-based commands, one or more scheduled SCA-based commands for a sequence execution; and executing, in sequence, the selected one or more SCA-based commands using one or more logical units (LUNs) of a channel in a memory component.

2. The method of claim 1, wherein the scheduling of the plurality of commands further comprises:

scheduling a first command that is associated with a first operation using a first DPS request queue; and scheduling, in parallel, a second command that is associated with a second operation using a second DPS request queue, wherein the first operation is independent from the second operation.

3. The method of claim 1, wherein the scheduling of the plurality of commands further comprises:

tracking a DPS request queue that is associated with a processing of a first command; and scheduling a second command in the tracked DPS request queue, wherein the second command is associated with an operation that is dependent upon an operation of the first command.

4. The method of claim 3, further comprising: using a look-up table (LUT) to track the operations between the first command and the second command.

5. The method of claim 1, further comprising: executing in sequence the selected one or more scheduled SCA-based commands via a plurality of NAND flash controller (NFC) queues.

6. The method of claim 1 further comprising: sending notification to a DPS, wherein the notification includes status of execution in the one or more LUNs.

7. The method of claim 1, wherein the memory component includes a NAND flash memory.

8. The method of claim 1, wherein the SCE field and the SCT field are used as references for an associated data transfer in a data bus.

9. An apparatus, comprising:

a memory component; and a separate command address (SCA)-based memory controller coupled to the memory component and configured to:
- receive a plurality of commands,
  - wherein the received plurality of commands includes high-level commands that are translated to observe an SCA protocol; and
  - wherein a particular SCA-based command under the SCA protocol includes a select chip enable (SCE) field and a select chip terminate (SCT) field;
- schedule the plurality of commands using two or more data path scheduler (DPS) request queues;
- convert the scheduled plurality of commands into SCA-based commands;
- select from the scheduled SCA-based commands one or more scheduled SCA-based commands for a sequence execution; and
- execute in sequence the selected one or more SCA-based commands using one or more logical units (LUNs) of a channel in the memory component.

10. The apparatus of claim 9, wherein the SCA-based memory controller is further configured to:

schedule in parallel the commands using corresponding DPS request queues, wherein the commands are associated with operations that are independent from one another.

11. The apparatus of claim 9, wherein the SCA-based memory controller is further configured to:

identify different fields on each of the scheduled SCA-based commands; and use the identified different fields to implement overlapping between the SCA-based commands.

12. The apparatus of claim 11, wherein the identified different fields include a Select Chip Enable (SCE) field and a Select Chip Terminate (SCT) field.

13. The apparatus of claim 12, wherein the SCE field and the SCT field are used as references for an associated data burst in a data (DQ) bus.

14. The apparatus of claim 9, wherein the SCA-based memory controller is further configured to:

use a look-up table (LUT) to track status of scheduled commands; and use the tracked status to schedule a next command.

15. The apparatus of claim 9, wherein the SCA-based memory controller is further configured to:

generate a sequence of command executions for an ONFI-based memory component.

16. An apparatus, comprising:

a storage device comprising:

a memory component; and a memory controller that is further configured to:

receive a plurality of commands, wherein the received plurality of commands includes high-level commands that are translated to observe an SCA protocol; and wherein a particular SCA-based command under the SCA protocol includes a select chip enable (SCE) field and a select chip terminate (SCT) field;

schedule the plurality of commands using two or more data path scheduler (DPS) request queues;

select from the scheduled commands one or more scheduled commands for a sequence execution; and execute in sequence the selected one or more using one or more logical units (LUNs) of a channel in the memory component.

17. The apparatus of claim 16, wherein the memory controller selects the one or more scheduled commands for the sequence execution based on a request priority associated with each of the scheduled commands.

18. The apparatus of claim 16, wherein the memory controller selects the one or more scheduled commands for the sequence execution based on a workload in the one or more LUNs.

* * * * *